B. R. HAMMOND.
LUBRICATING DEVICE.
APPLICATION FILED MAR. 15, 1919.
1,356,918.
Patented Oct. 26, 1920.
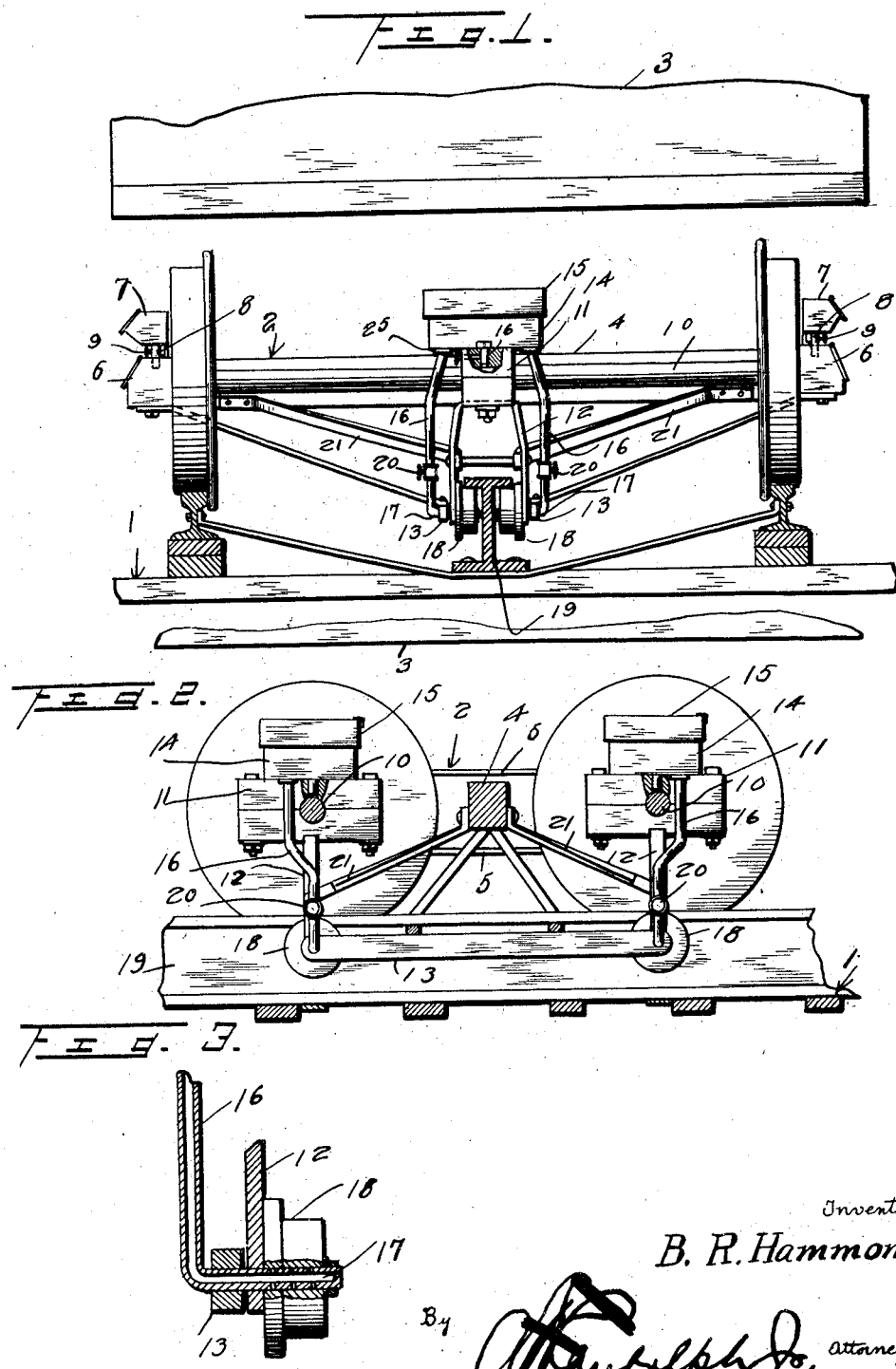

UNITED STATES PATENT OFFICE.

BENJAMIN R. HAMMOND, OF BELOIT, WISCONSIN, ASSIGNOR TO MARY ELZADA RASMUSSEN, OF JANESVILLE, WISCONSIN.

LUBRICATING DEVICE.

1,356,918.   Specification of Letters Patent.   Patented Oct. 26, 1920.

Application filed March 15, 1919. Serial No. 282,850.

*To all whom it may concern:*

Be it known that I, BENJAMIN R. HAMMOND, a citizen of the United States, residing at Beloit, in the county of Rock and State of Wisconsin, have invented certain new and useful Improvements in Lubricating Devices; and I do hereby declare the following to be a full, clear, and exact description of the invention, such as will enable others skilled in the art to which it appertains to make and use the same.

This invention relates to improvements in lubricating devices especially adaptable for use in connection with a railroad safety device of the character shown and described in my application for Letters Patent, filed Nov. 30, 1917 and serially numbered 204,677 and has for one of its objects the provision of means whereby lubricant can be conveniently furnished the bearings, journal boxes and guard wheels or rollers at all times so as to prevent over heating of these parts while in use.

Another object of this invention is the provision of lubricating pipes to the guard wheels or rollers and which are also adapted to form axles for said wheels or rollers.

A still further object of this invention is the provision of a lubricating device of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which:

Figure 1 is an end elevation partly in section of a railroad safety device having a lubricating device applied thereto and which is constructed in accordance with my invention.

Fig. 2 is a longitudinal sectional view of the same.

Fig. 3 is a detail sectional view of one of the lubricating pipes having the guard wheel or roller journaled thereon.

Referring in detail to the drawing, the numeral 1 indicates a railroad track, while the numeral 2 indicates a car truck carrying a car body 3. The car truck consists of a transverse beam 4 having members 5 secured to the ends thereof and which extends longitudinally and have journal boxes 6 secured to the ends thereof. The journal boxes are of any desired construction and have secured thereto lubricating boxes 7 adapted to contain lubricants and which is fed into the journal boxes by way of pipes 8. The passages through the pipes are very small so that only a small amount of lubricant enters the journal boxes at one time. Valves 9 are located in the pipes for controlling the passage of the lubricant through said pipes and provides means whereby the flow of lubricant to the journal boxes can be cut-off when desired.

Car axles 10 have their ends journaled in the journal boxes and have secured thereto wheels that travel on the track 1. Bearing members 11 are mounted on the axles 10 and have secured thereto substantially U-shaped member 12 which have their arms depending downwardly and connected together by rods 13. Mounted upon the bearing members 11 are lubricating boxes 14 provided with removable covers 15 so they can be conveniently filled with lubricant when desired. Downwardly depending feed pipes 16 are secured to the lubricating boxes 14 and have communication with the interior thereof and have their lower ends angularly related to form axles 17 which extend through openings in the lower ends of the arms of the U-shaped members 12 and journaled thereon guard wheels or rollers 18 which engage a guard rail 19 carried by the track 1. The axles 17 are provided with openings to permit the lubricant to pass out of the pipes 16 onto the rollers or wheels 18. The ends of the axles 17 are closed so as to prevent the lubricant from wasting. Valves 20 are located in the feed pipes 16 for controlling the lubricant therethrough.

A plurality of braces 21 are secured to the beam 4 and to the arms of the U-shaped members 12 so as to reinforce the safety device.

While I have shown and described the preferred embodiment of my invention, it will be understood that minor changes in construction, combination and arrangement of parts may be made without departing from the spirit and scope of the invention as claimed.

Having thus described my invention, what I claim is:

In combination, a guard wheel bearing and a guard wheel, a lubricant reservoir carried by the bearing, a tube in communication with the reservoir and depending downwardly therefrom and having its lower end disposed at right angles and closed and extending through the wheel to form an axle therefor, said right angled end of the tube having openings to permit lubricant to escape therefrom to the wheel, and a valve in said tube.

In testimony whereof I affix my signature.

BENJAMIN R. HAMMOND.